(12) United States Patent
Senatori

(10) Patent No.: US 8,336,344 B2
(45) Date of Patent: Dec. 25, 2012

(54) COMPUTER LOCK EXTENSION DEVICE

(75) Inventor: Mark Senatori, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/258,347

(22) PCT Filed: Jul. 6, 2009

(86) PCT No.: PCT/US2009/049688
§ 371 (c)(1),
(2), (4) Date: Sep. 21, 2011

(87) PCT Pub. No.: WO2011/005248
PCT Pub. Date: Jan. 13, 2011

(65) Prior Publication Data
US 2012/0017656 A1    Jan. 26, 2012

(51) Int. Cl.
*E05B 73/00* (2006.01)
(52) U.S. Cl. .............. 70/14; 70/49; 70/58; 24/458
(58) Field of Classification Search ............. 70/14, 18, 70/30, 49, 58, DIG. 63; 24/458
See application file for complete search history.

(56) References Cited

U.S. PATENT DOCUMENTS

| | | | | |
|---|---|---|---|---|
| 3,667,259 A * | 6/1972 | Reque et al. | ............ | 70/14 |
| 3,953,990 A * | 5/1976 | Nagel | ............ | 70/18 |
| 4,085,599 A * | 4/1978 | Fischer et al. | ............ | 70/14 |
| 4,462,233 A * | 7/1984 | Horetzke | ............ | 70/428 |
| 4,680,949 A * | 7/1987 | Stewart | ............ | 70/14 |
| 5,400,622 A * | 3/1995 | Harmon | ............ | 70/14 |
| 5,673,574 A * | 10/1997 | Bertram | ............ | 70/18 |
| 5,787,739 A * | 8/1998 | Derman | ............ | 70/58 |
| 6,038,891 A * | 3/2000 | Zeren et al. | ............ | 70/58 |
| 6,105,922 A * | 8/2000 | Derman | ............ | 248/551 |
| 6,257,029 B1 | 7/2001 | Liao | | |
| 6,301,940 B1 * | 10/2001 | Derman et al. | ............ | 70/58 |
| 6,505,487 B1 * | 1/2003 | Garel et al. | ............ | 70/18 |
| 6,742,366 B1 * | 6/2004 | Lai | ............ | 70/58 |
| 7,237,410 B2 * | 7/2007 | Millist | ............ | 70/58 |
| 7,331,203 B2 * | 2/2008 | Lee | ............ | 70/14 |
| 2001/0013234 A1 | 8/2001 | Murray | | |
| 2002/0056295 A1 | 5/2002 | Huang | | |
| 2004/0040350 A1 | 3/2004 | Derman | | |
| 2004/0168486 A1 | 9/2004 | Ling | | |
| 2006/0032275 A1 * | 2/2006 | Hooks, Jr. | ............ | 70/58 |

* cited by examiner

Primary Examiner — Lloyd Gall
(74) Attorney, Agent, or Firm — Scott Gallert

(57) ABSTRACT

A device is configured to be adjusted between open and closed conditions, and to securely engage a security slot of a portable computer when in the closed condition. The device defines an internal cavity that is configured to receive a portion of a cable-like computer lock when the device is in the closed condition. The device is further configured to extend the computer lock away from the housing of the portable computer. The device prevents the computer lock from obstructing access to surface features on the computer proximate to the security slot.

8 Claims, 4 Drawing Sheets

COMPUTER LOCK EXTENSION DEVICE

BACKGROUND

Numerous portable and laptop computers include a security slot defined within an edge of the housing and configured to receive a cable-type computer locking device. The other end of such a cable lock is typically configured to be looped about a table leg, secured to an anchor point, etc. In this way, portable computers can be securely used and left unattended for brief periods of time in public settings such as a library, a university study hall, etc.

However, the security slot on many computers is located proximate to an accessory port, cable connector or other surface feature that is physically blocked against access when a cable lock is in use. The present teachings address the foregoing concerns.

BRIEF DESCRIPTION OF THE DRAWINGS

The present embodiments will now be described, by way of example, with reference to the accompanying drawings, in which.

DETAILED DESCRIPTION

Introduction

Means and methods for providing securing a laptop computer or other device by way of an extension device and cable-type lock. An extension apparatus includes two portions that are pivotally coupled to each other by way of a pin or bolt. The two portions pivot toward and away from each so as to define open and closed conditions for the apparatus. The apparatus has a number of tooth-like projections that can be inserted into a computer security slot while in the open condition, and securely engage the security slot when in the closed condition. A cable-type or similar computer lock can be used to secure the computer or other device to a table or other anchor point by way of the extension apparatus.

In one embodiment, an apparatus includes a first portion that defines a first through aperture. The apparatus also includes a second portion that defines a second through aperture. The second portion is configured to pivot relative to the first portion between an open state and a closed state of the apparatus. The first and second portions define an internal cavity configured to lockably receive a portion of a locking device, by way of the first and second through apertures, when the apparatus is in the closed state. The apparatus is further configured to securely engage a security slot of an entity when the apparatus is in the closed state.

In another embodiment, an apparatus for use with a computer locking device includes a first portion including two extensions each terminating in an orthogonal tooth-like projection. The apparatus also includes a second portion including one extension terminating in an orthogonal tooth-like projection. The second portion is at least partially received within the first portion and is configured to pivot between an open condition and a closed condition of the apparatus. The apparatus is configured to securely receive a portion of a computer locking device within an internal cavity when the apparatus is in the closed condition. The apparatus is further configured to securely engage a security slot of a computer by way of the orthogonal tooth-like projections.

In yet another embodiment, an apparatus includes a first portion and a second portion pivotally coupled to each other. The first portion and the second portion are respectively configured to define an internal cavity bounded by at least two walls. The apparatus is configured to securely couple a computer lock to a security slot of a computer by way of a portion of the computer lock received within the internal cavity.

First Illustrative Embodiment

Figure 1:
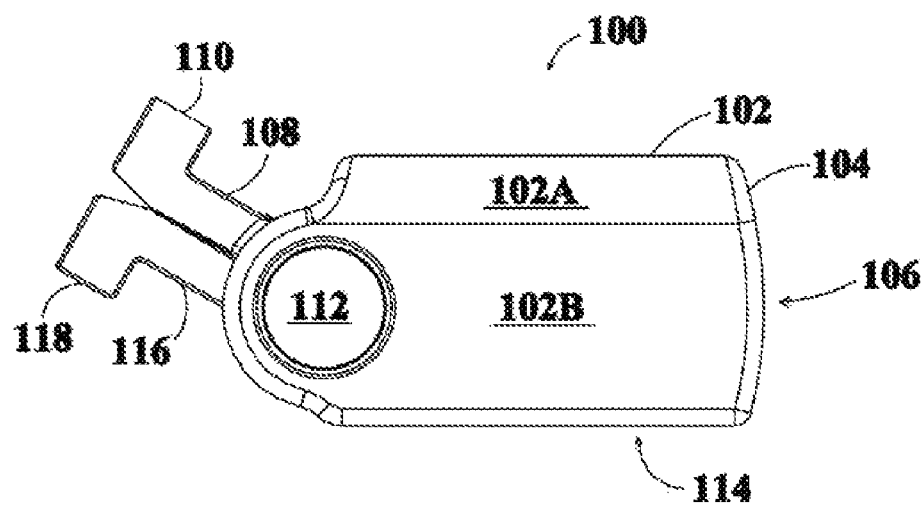
FIG. 1 depicts a side elevation view of an apparatus according to one embodiment in a first state.

Reference is now directed to FIG. 1, which depicts a side elevation view of a lock extension apparatus 100. The apparatus 100 is illustrative and non-limiting with respect to the present teachings. Thus, other apparatuses can be configured and/or operated in accordance with the present teachings.

The apparatus 100 includes a body portion 102. The first body portion 102 is formed from any suitable rigid material such as plastic, aluminum, brass, stainless steel, etc. Other materials can also be used. The body portion 102 defines a plurality of side walls of which walls 102A and 102B are depicted. The body portion 102 further defines a front wall 104 having a through aperture 106 defined therein. The front wall 104 and the plurality of side walls (including 102A and 102B) define (i.e., are disposed about) an interior cavity of the apparatus 100.

The body portion 102 includes two rearward extensions 108 that each terminate in an orthogonal, tooth-like projection 110. Thus, the body portion 102, extensions 108 and tooth-like projections 110 are respective portions of a continuous, one-piece construction. The apparatus 100 also includes a pin 112 that extends through the body portion 102.

The apparatus 100 includes a second body portion 114 that is formed from a rigid material consistent or compatible with that of the first body portion 102 (e.g., plastic, metal, etc.). The body portion 114 is pivotally joined (mechanically coupled) to the body portion 102 by way of the pin 112. The body portion 114 includes a rearward extension 116 that terminates in an orthogonal, tooth-like projection 118. It is noted that the tooth-like projection 118 is directed in an opposite sense relative to that of the tooth-like projections 110. The body portion 114, extension 116 and tooth-like projection 118 are respective portions of a continuous, one-piece construction. The apparatus 100 is depicted in a closed state in FIG. 1, while a greater fraction of the body portion 114 is received within the cavity defined by the body portion 102.

Figure 2:
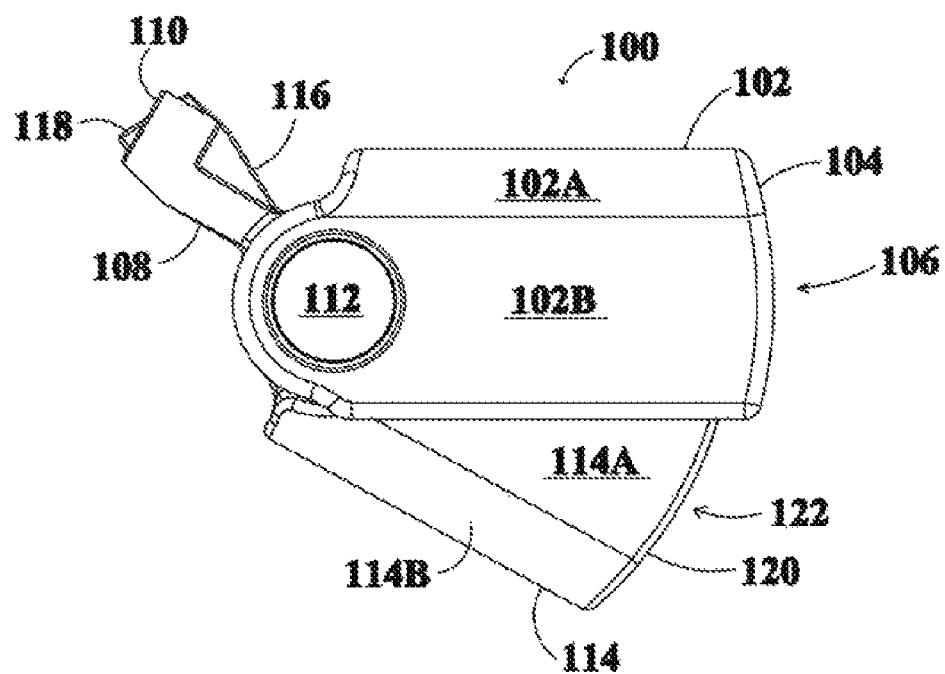
FIG. 2 depicts a side elevation view of the apparatus of FIG. 1 in a second state.

Reference is now made to FIG. 2, which depicts a side elevation view of the lock extension apparatus 100. The body portion 114 defines a plurality of side walls, of which walls 114A and 114B are depicted. The body portion 114 defines a front wall 120 having a through aperture 122 defined therein.

The second body portion 114 is pivoted generally away from the first body portion 102 by virtue of the pin 112. The front wall 120 and the plurality of side walls (including 114A and 114B) of body portion 114 cooperate with the front wall 104 and side walls (including 102A and 102B) of body portion 102 to define an interior cavity of the apparatus 100. It is noted that the apparatus 100 is depicted in an open state in FIG. 2. Normal operation of the lock extension apparatus 100 is described hereinafter.

Figure 3:
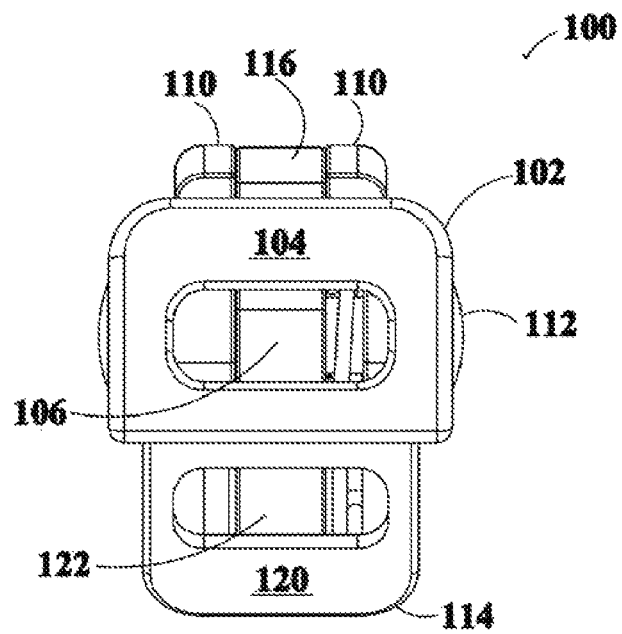
FIG. 3 depicts a front elevation view of the apparatus of FIG. 1 in the second state.

FIG. 3 depicts a front elevation view of the lock extension apparatus 100 in an open state. It is noted that the respective through apertures 106 and 122 are disposed apart from each other and are thus not aligned.

Figure 4:
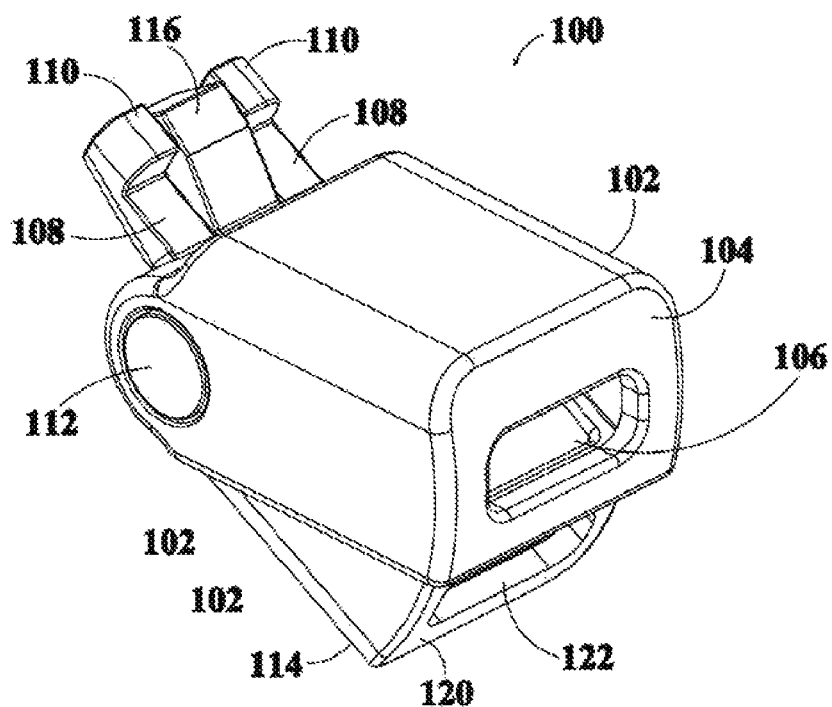
FIG. 4 depicts a perspective view of the apparatus of FIG. 1 in the second state.

FIG. 4 depicts a perspective view of the lock extension apparatus 100 in an open state. It is noted that the body portion 102 is of greater girth than the body portion 114, such that the body portion 114 is at least partially received within the body portion 102.

First Illustrative System

Figure 5:
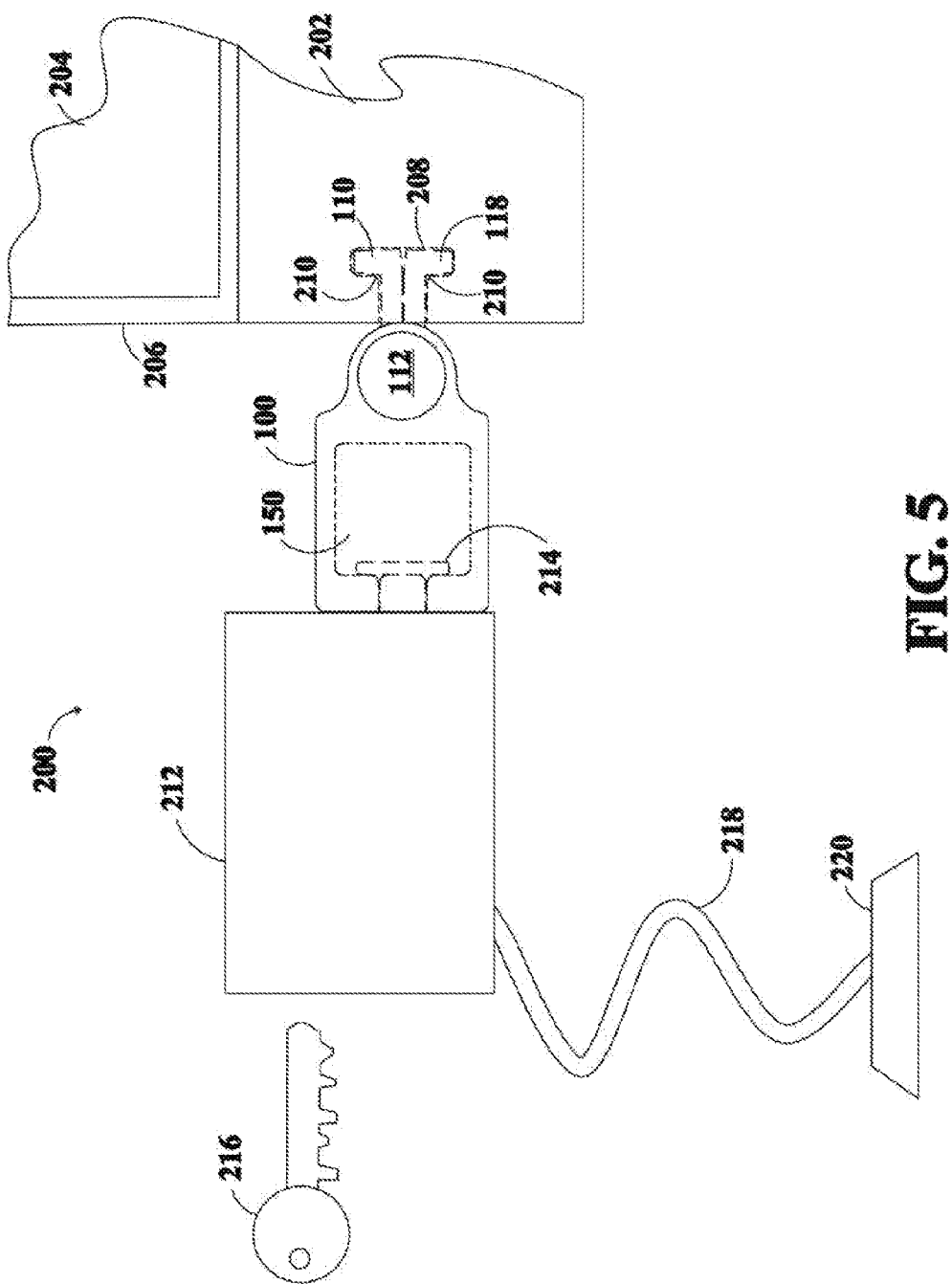
FIG. 5 is a schematic view depicting a system according to one embodiment.

FIG. 5 is a schematic diagram depicting a system 200 according to another embodiment of the present teachings. The system 200 is illustrative and non-limiting in nature. As such, other systems and arrangements are contemplated consistent with the present teachings.

The system 200 includes a laptop computer 202 depicted in partial view. The laptop computer 202 includes an electronic display 204 that is supported by way of a cover portion 206. The laptop computer 202 further includes (or defines) a security slot (or cavity) 208 including interior corner features 210. Thus, the security slot 208 is defined such that an aperture extends from the exterior of the laptop computer 202 into an expanded interior cavity. The security slot 208 is configured to be mechanically engaged by a cable-type security lock, such as available from Kensington Computer Products Group, Redwood Shores, Calif., USA. One having ordinary skill in the computer arts is familiar with various cable locks and further elaboration is not required for understanding the present teachings.

The system 200 also includes a lock extension apparatus 100. The apparatus 100 is as depicted in FIGS. 1-4 and as described above. Thus, the apparatus 100 include tooth-like projections 110 and 118 that are configured to be received within and engaged to the security slot 208 of the laptop computer 202. The respective body portions 102 and 114 of the apparatus 100 define an interior cavity 150.

The system 200 further includes a cable-type computer lock 212. The cable lock 212 includes an engagement portion 214 that is configured to be received within the interior cavity 150 of the apparatus 100 by way of through apertures 106 and 122. The cable lock 212 is further configured to lock to (i.e., securely mechanically engage) the apparatus 100 by way of a key 216. In turn, the cable lock 212 includes a cable portion 218 that can be secured to an anchor point 220. The anchor point 220 can be defined by any mechanism, entity or assemblage as required and further elaboration is not required for purposes of understanding the present teachings. Assemblage and use of the system 200 is described hereinafter.

First Illustrative Method

Figure 6:
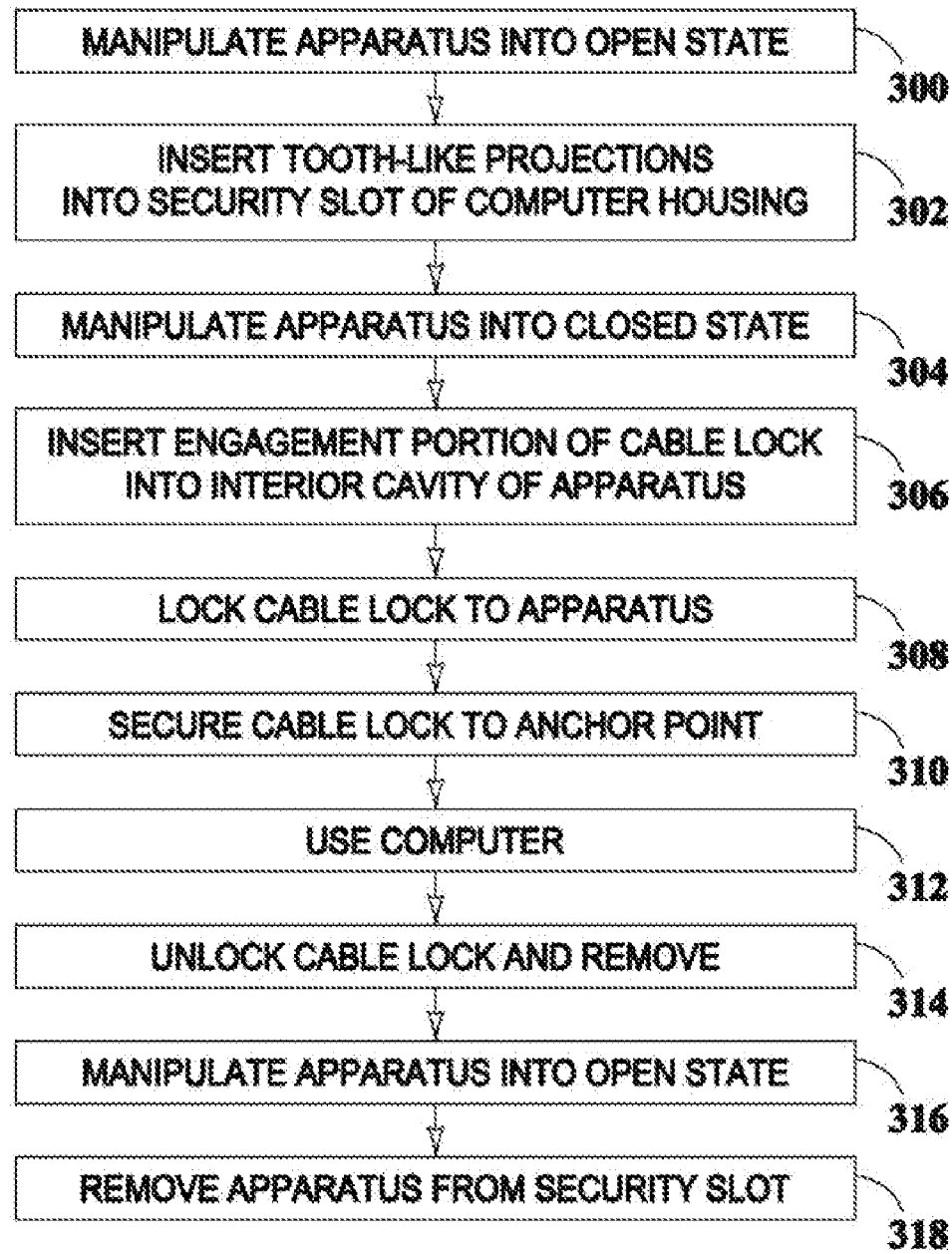
FIG. 6 is a flow diagram depicting a method according to one embodiment.

FIG. 6 is a flow diagram depicting a method according to one embodiment of the present teachings. The method of FIG. 6 includes particular operations and order of execution. However, other methods including other operations, omitting one or more of the depicted operations, and/or proceeding in other orders of execution can also be used according to the present teachings. Thus, the method of FIG. 6 is illustrative and non-limiting in nature. Reference is also made to FIGS. 1-5 in the interest of understanding the method of FIG. 6.

At 300, a lock extension apparatus is manipulated into an open state (or condition). For purposes of illustrative example, an apparatus 100 is manipulated into an open state as depicted in FIG. 2

At 302, the tooth-like projections of the lock extension apparatus are inserted into a security slot of a computer. For purposes of the ongoing example, it is assumed that the tooth-like projections 110 and 118 of the apparatus 100 are inserted into a security slot 208 of a laptop computer 202.

At 304, the lock extension apparatus is manipulated into a closed state. As such, the tooth-like projections mechanically engage the interior features of the security slot of the computer. For purposes of the example, the apparatus 100 is in the closed state as depicted in FIG. 5, while the tooth-like projections 110 and 118 engage the interior corner features 210 of the security slot 208.

At 306, an engagement (or locking) portion of a cable lock is inserted into an interior cavity of the lock extension apparatus. For purposes of the ongoing example, a locking (i.e., engagement) portion 214 of a cable lock 212 is inserted into the interior cavity 150 of the apparatus 100 as depicted in FIG. 5.

At 308, the cable lock is locked to the lock extension apparatus. For purpose of example, the cable lock 212 is locked to the apparatus 100 by way of a key 216 as depicted in FIG. 5. At this point, the cable lock 212 is mechanically secured to the laptop computer 202 by way of the apparatus 100. Additionally, accessory ports such as a USB port, a PCMCIA slot, or other feature (not shown) located on the computer 202 adjacent to the security slot 208 are accessible for use and are not obstructed by the cable lock 212. Furthermore, the locking portion 214 of the cable lock 212 is protected against tampering (e.g., cutting, filing, etc.) as it is concealed inside of the cavity 150 of the apparatus 100.

At 310, the cable lock is secured to an anchor point such that the computer cannot be removed by merely carrying it away. For purposes of the example, it is assumed that the cable lock 212 is secured to an anchor point (or mechanism) 220 by way of the cable portion 218 of the cable lock 212 as depicted in FIG. 5. One having ordinary skill in the art of computer security is familiar with the normal operation and use of a cable-type computer lock and further elaboration is not needed for purposes of understanding the present teachings.

At 312, the computer may be used as normal while being secured. As such, a user can leave the computer unattended for a brief period of time with confidence that significant efforts must be made by a thief in order to steal the computer.

At 314, the cable lock is unlocked and removed from the lock extension apparatus. For purposes of example, it is assumed that the key 216 is used to unlock the cable lock 212, which in turn is removed from the apparatus 100. The laptop computer 202 can now be freely moved about.

At 316, the lock extension apparatus is manipulated into an open state. For purposes of the ongoing example, the apparatus 100 is manipulated into the open condition as shown in FIG. 2.

At 318, the lock extension apparatus is removed from the security slot of the computer.

The foregoing method is illustrative of any number of methods contemplated by the present teachings. In general, and without limitation, a lock extension apparatus is engaged to a security slot of a laptop computer or other device. Then, a cable lock or similar assembly is lockably engaged to the lock extension apparatus and secured to a suitable anchor point. The computer or other device is now secured against simple carry-and-go theft, while accessory ports or other features on the surface of the computer adjacent to the security slot are still accessible for normal use. Thus, the lock extension apparatus serves to offset the cable lock (or other mechanism) away from the computer so that other features are not obstructed: Numerous other methods consistent with the operations and/or objectives of the present teachings can also be used.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus for use with a computer locking device, the apparatus comprising:
   a first portion including two extensions each terminating in an orthogonal tooth-like projection, the first portion defining a first through aperture;
   a second portion including one extension terminating in an orthogonal tooth-like projection, the second portion defining a second through aperture, the second portion at least partially received within the first portion and configured to pivot between an open condition and a closed condition of the apparatus, the apparatus configured to securely receive a portion of a computer locking device within an internal cavity by way of an alignment of the through apertures when the apparatus is in the closed condition, the internal cavity being bounded by at least four walls when the apparatus is in the closed condition, the apparatus configured to securely engage a security slot of a computer by way of the orthogonal tooth-like projections.

2. An apparatus according to claim 1, the first portion defined by a continuous one-piece construction, the second portion defined by a continuous one-piece construction.

3. The apparatus according to claim 1, the apparatus being in the closed condition when securely engaging a security slot of a computer by way of the orthogonal tooth-like projections.

4. The apparatus according to claim 1, the orthogonal tooth-like projections configured to be insertable into and removable from a security slot of a computer when the apparatus is in the open condition.

5. The apparatus according to claim 1 further comprising a pin configured to couple the second portion in pivotal relationship to the first portion.

6. The apparatus according to claim 1, the first portion including an end wall defining the first through aperture, the second portion including an end wall defining the second through aperture.

7. The apparatus according to claim 1, the first portion being of greater girth than the second portion.

8. The apparatus according to claim 1, the first portion and the second portion respectively configured such that the internal cavity is substantially bounded except for the aligned through apertures when the apparatus is in the closed conditioned.

* * * * *

UNITED STATES PATENT AND TRADEMARK OFFICE
CERTIFICATE OF CORRECTION

PATENT NO. : 8,336,344 B2
APPLICATION NO. : 13/258347
DATED : December 25, 2012
INVENTOR(S) : Mark Senatori Page 1 of 1

It is certified that error appears in the above-identified patent and that said Letters Patent is hereby corrected as shown below:

In the Claims:

In column 6, line 13, in Claim 3, delete "dosed" and insert -- closed --, therefor.

Signed and Sealed this
Twenty-eighth Day of May, 2013

Teresa Stanek Rea
*Acting Director of the United States Patent and Trademark Office*